(12) United States Patent
Noh et al.

(10) Patent No.: US 11,256,305 B2
(45) Date of Patent: Feb. 22, 2022

(54) DISPLAY APPARATUS

(71) Applicant: SAMSUNG ELECTRONICS CO., LTD., Suwon-si (KR)

(72) Inventors: Jun Ki Noh, Suwon-si (KR); Jae Hoo Park, Suwon-si (KR); Gyu Sung Do, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 322 days.

(21) Appl. No.: 16/065,355

(22) PCT Filed: Dec. 5, 2016

(86) PCT No.: PCT/KR2016/014177
§ 371 (c)(1),
(2) Date: Jun. 22, 2018

(87) PCT Pub. No.: WO2017/111347
PCT Pub. Date: Jun. 29, 2017

(65) Prior Publication Data
US 2021/0208642 A1      Jul. 8, 2021

(30) Foreign Application Priority Data
Dec. 24, 2015   (KR) ........................ 10-2015-0186560

(51) Int. Cl.
*G06F 1/18*    (2006.01)
*F16M 11/04*   (2006.01)

(52) U.S. Cl.
CPC ............. *G06F 1/181* (2013.01); *F16M 11/04* (2013.01)

(58) Field of Classification Search
CPC ................................. G06F 1/181; F16M 11/04
See application file for complete search history.

(56) References Cited

U.S. PATENT DOCUMENTS

| 4,007,852 A | * | 2/1977 | Gernhardt | .............. | H02G 3/085 |
| | | | | | 220/3.2 |
| 4,825,339 A | * | 4/1989 | Boudon | ................. | H02G 3/085 |
| | | | | | 174/385 |

(Continued)

FOREIGN PATENT DOCUMENTS

| EP | 2 337 343 | 6/2011 |
| JP | 10-184647 | 7/1998 |

(Continued)

OTHER PUBLICATIONS

Korean Office Action dated Oct. 15, 2019 in corresponding Korean Patent Application No. 10-2015-0186560.

(Continued)

*Primary Examiner* — Rockshana D Chowdhury
*Assistant Examiner* — Keith DePew
(74) *Attorney, Agent, or Firm* — Staas & Halsey LLP

(57) ABSTRACT

A printed circuit board mounting structure having an improved structure to improve the assemblability of a product and a display apparatus including the same are disclosed. The printed circuit board mounting structure may include a mounting member provided on a printed circuit board and a mounting hole provided on a chassis so that the printed circuit board may be mounted on the chassis without using a screw.

12 Claims, 19 Drawing Sheets

(56) References Cited

U.S. PATENT DOCUMENTS

| | | | | |
|---|---|---|---|---|
| 4,995,527 | A * | 2/1991 | Sauder | H02G 3/083 |
| | | | | 220/266 |
| 5,637,829 | A * | 6/1997 | Nakamura | H02G 3/085 |
| | | | | 174/666 |
| 7,476,807 | B1 * | 1/2009 | Gretz | H02G 3/123 |
| | | | | 174/58 |
| 8,026,443 | B1 * | 9/2011 | Czarnecki | H02G 3/085 |
| | | | | 174/66 |
| 8,592,694 | B2 * | 11/2013 | Bennett | H05K 5/0247 |
| | | | | 174/666 |
| 8,662,604 | B2 * | 3/2014 | Rajvanshi | H02G 3/085 |
| | | | | 312/223.1 |
| 9,054,511 | B1 * | 6/2015 | Wein, Jr. | H02G 3/085 |
| 9,113,561 | B2 * | 8/2015 | Kominami | G06F 1/1615 |
| 9,591,773 | B2 * | 3/2017 | Shin | G02F 1/133308 |
| 9,819,167 | B2 * | 11/2017 | Kummer | H02G 3/086 |
| 2004/0258500 | A1 * | 12/2004 | Ireland | H05K 3/325 |
| | | | | 411/81 |
| 2010/0084188 | A1 * | 4/2010 | Rajvanshi | H02G 3/085 |
| | | | | 174/666 |
| 2011/0116218 | A1 * | 5/2011 | Choi | H04N 5/64 |
| | | | | 361/679.01 |
| 2011/0278060 | A1 * | 11/2011 | Rajvanshi | H02G 3/085 |
| | | | | 174/666 |
| 2013/0109253 | A1 * | 5/2013 | Gammon | F16M 13/00 |
| | | | | 439/883 |
| 2015/0097102 | A1 | 4/2015 | Cassidy et al. | |
| 2015/0304599 | A1 | 10/2015 | Yamamoto | |
| 2017/0021928 | A1 * | 1/2017 | Satterfield | B64D 11/0624 |

FOREIGN PATENT DOCUMENTS

| | | |
|---|---|---|
| JP | 2007-81251 | 3/2007 |
| JP | 2009-216739 | 9/2009 |
| JP | 2015-56621 | 3/2015 |
| KR | 1998-033744 | 9/1998 |
| KR | 10-0652267 | 11/2006 |
| KR | 20-2010-0000003 | 1/2010 |
| KR | 10-2011-0052125 | 5/2011 |

OTHER PUBLICATIONS

European Office Actioned dated Dec. 6, 2019 in corresponding European Patent Application No. 16879214.1.
International Search Report dated Mar. 14, 2017 from International Patent Application No. PCT/KR2016/014177, 5 pages.
Written Opinion of the International Searching Authority dated Mar. 14, 2017 from International Patent Application No. PCT/KR2016/014177, 7 pages.
Extended European Search Report dated Oct. 30, 2018 from European Patent Application No. 16879214.1, 7 pages.
Chinese Office Action dated Oct. 9, 2020 from Chinese Application No. 201680081798.4, 10 pages.
Chinese Office Action dated Mar. 11, 2020 from Chinese Patent Application No. 201680081798.4, 15 pages.

* cited by examiner

[Fig. 1]
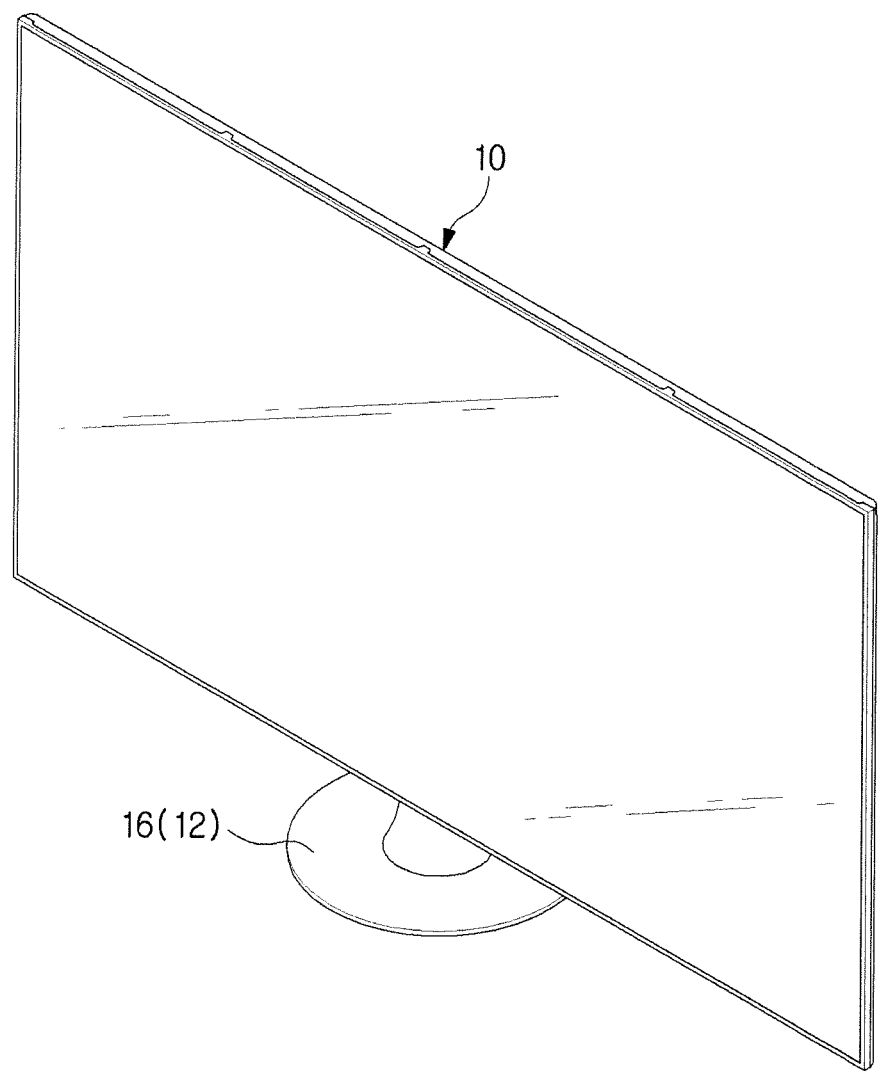

[Fig. 2a]
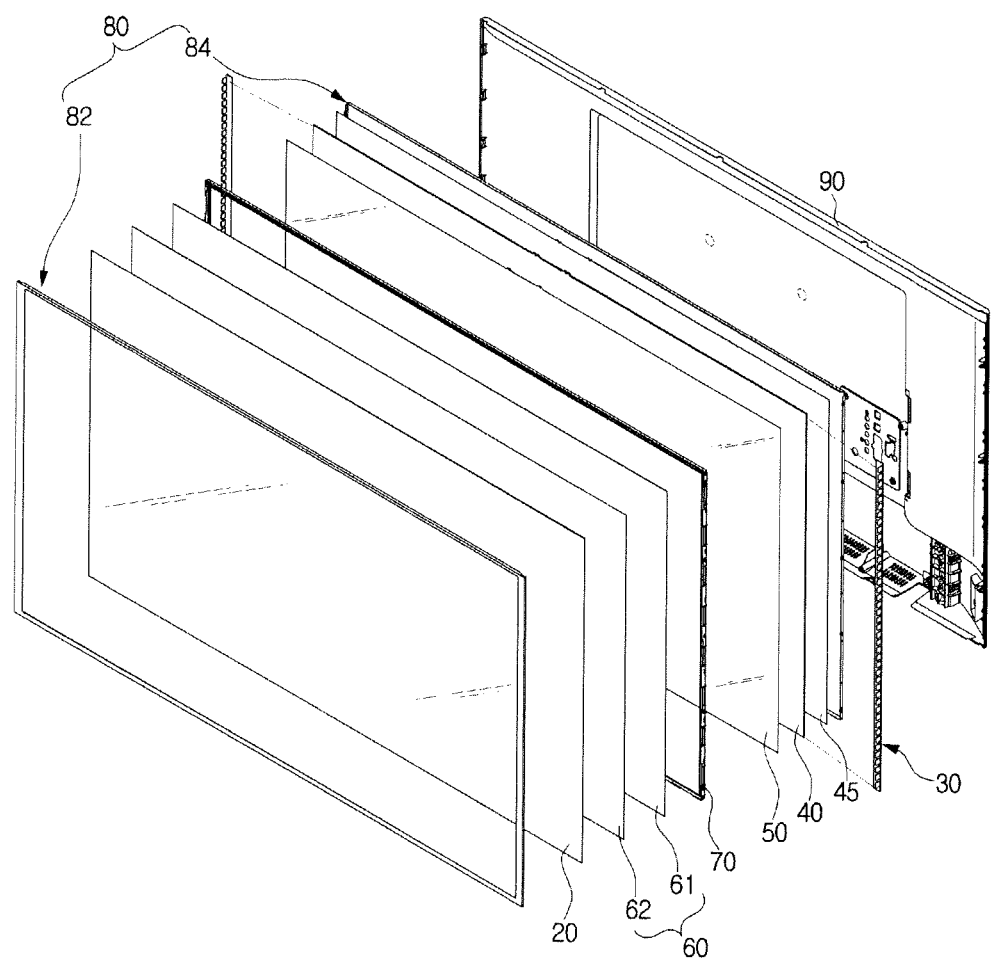

[Fig. 2b]
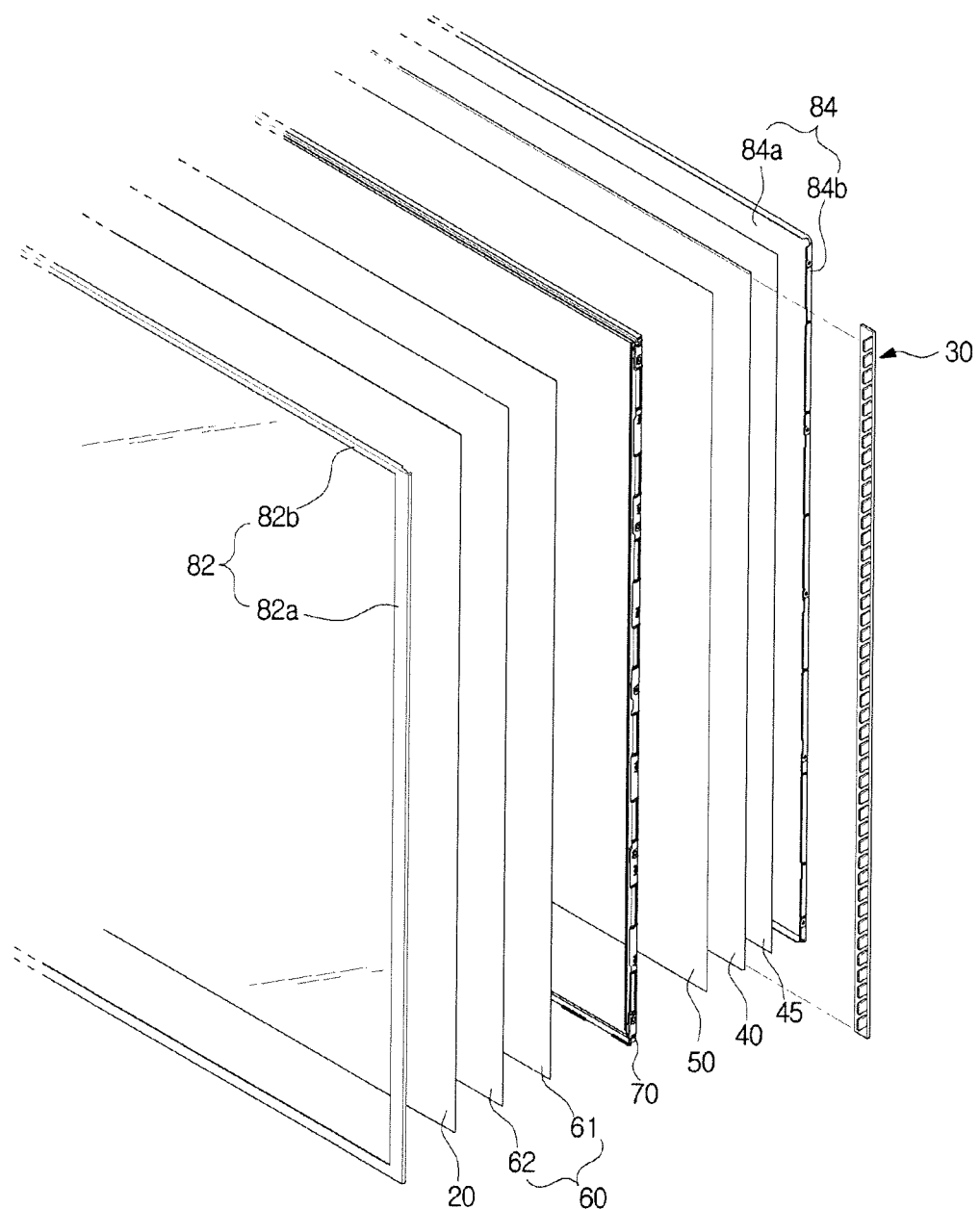

[Fig. 2c]
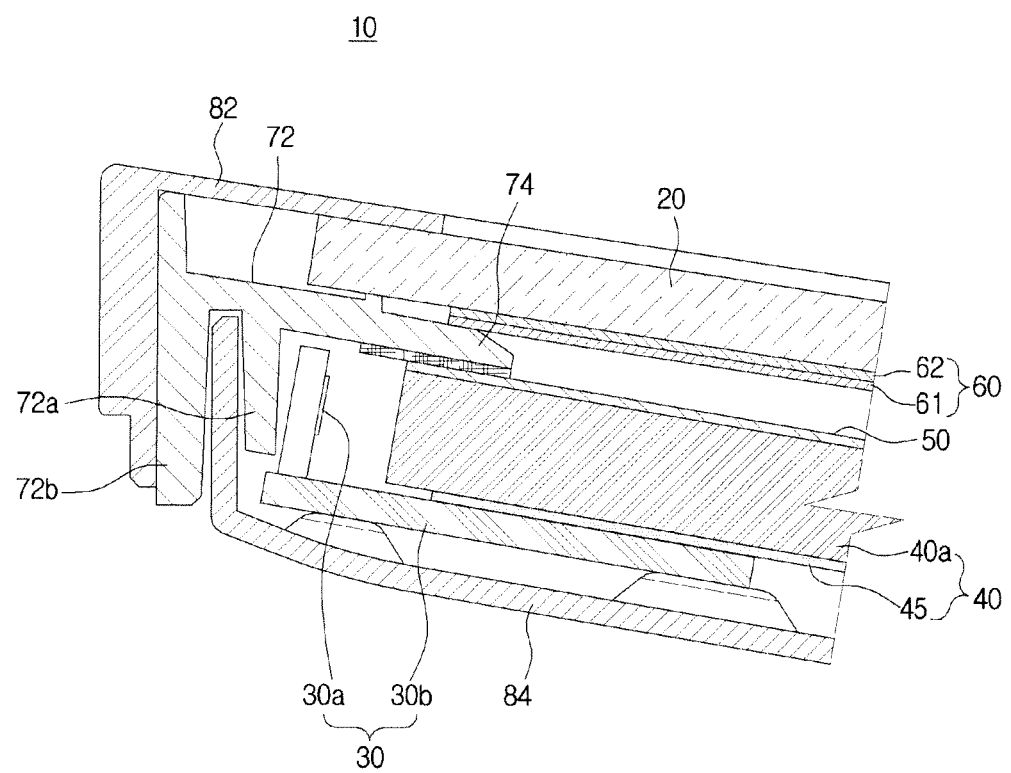

[Fig. 3]
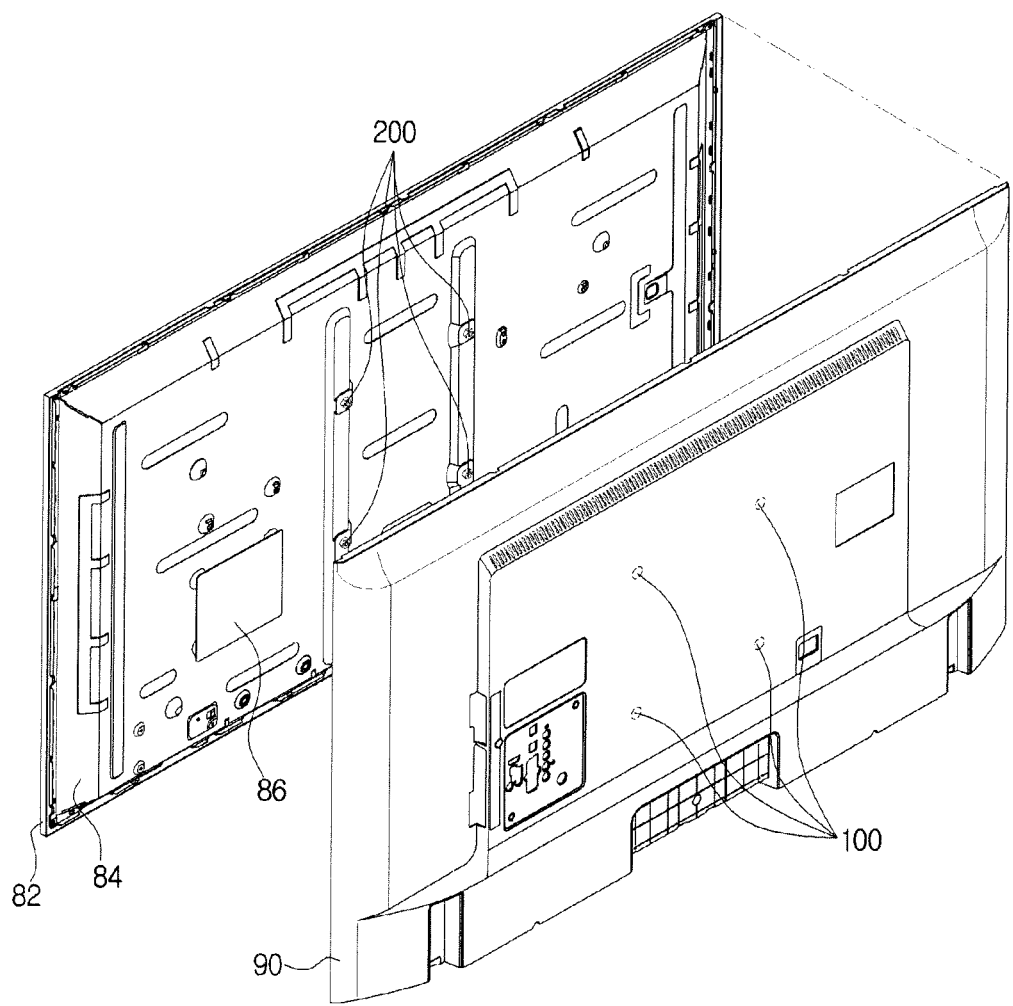

【Fig. 4】
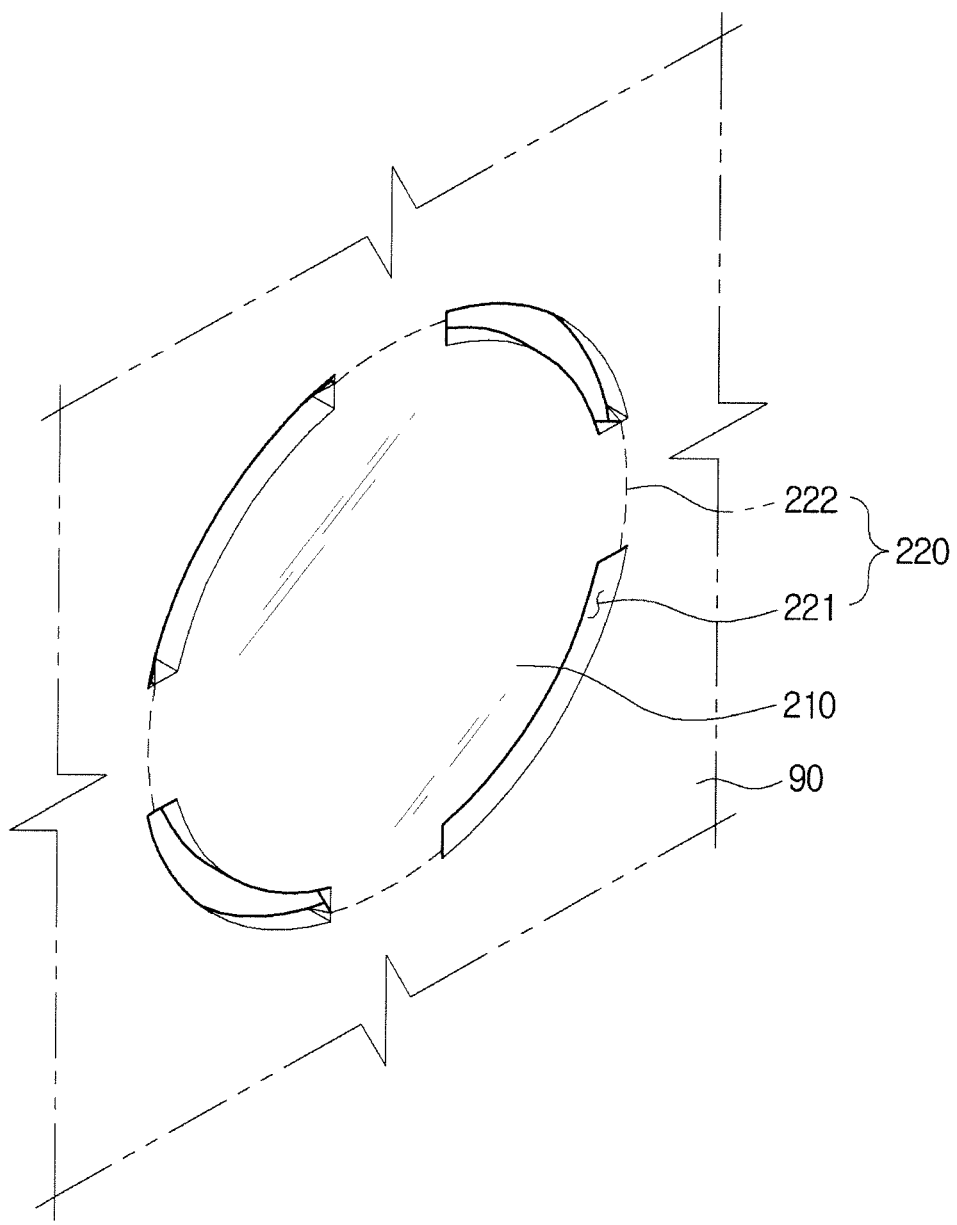

[Fig. 5]
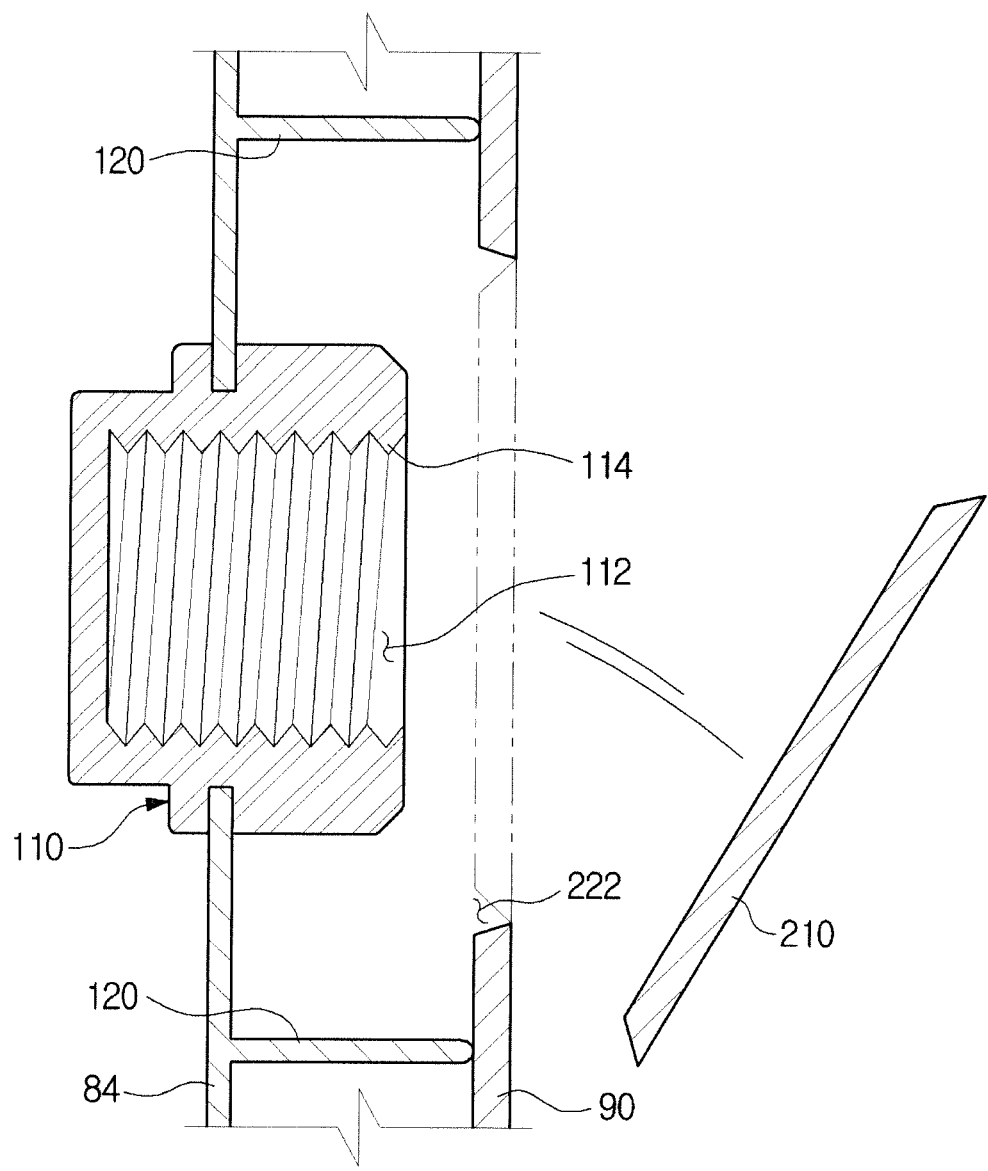

[Fig. 6]
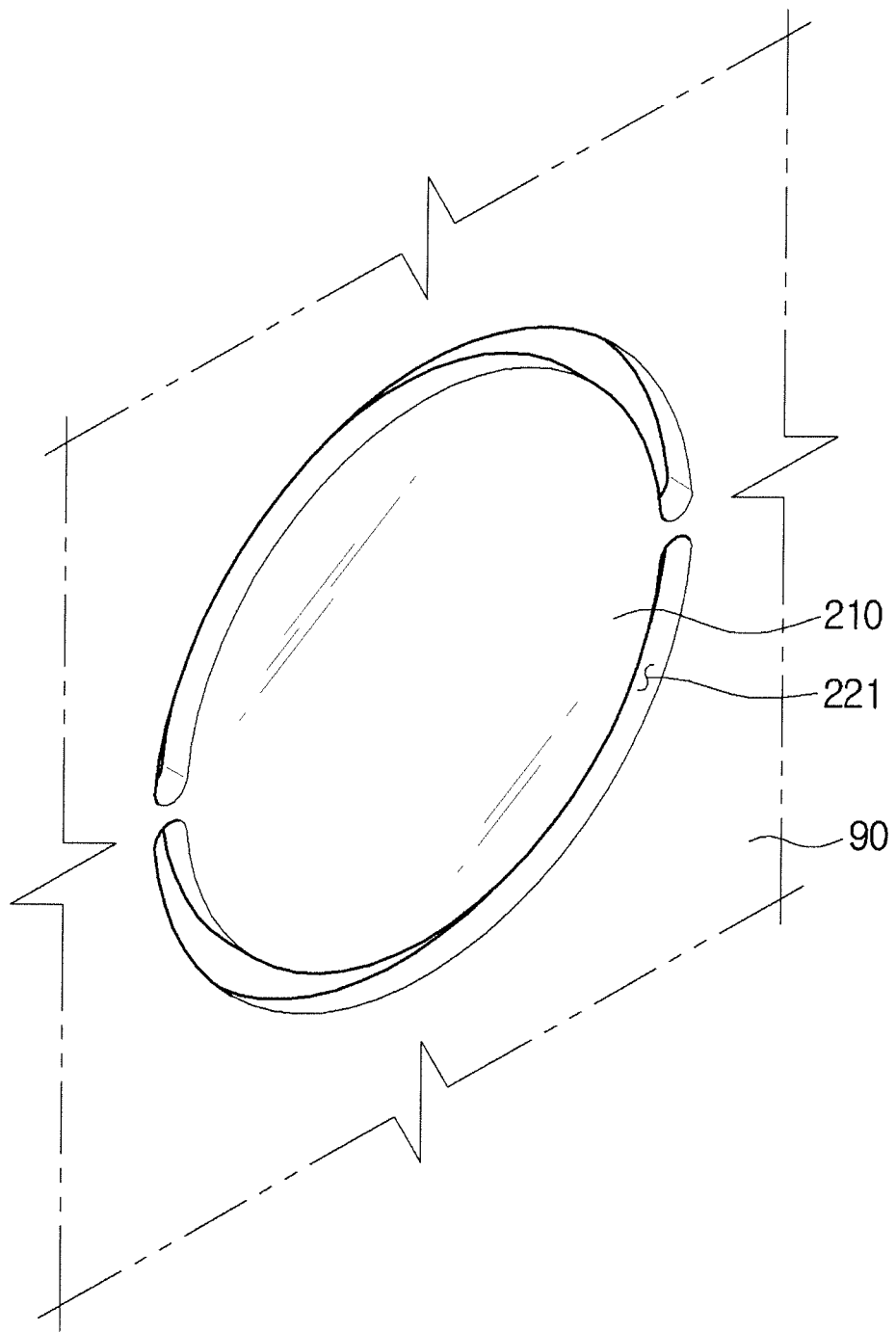

[Fig. 7]
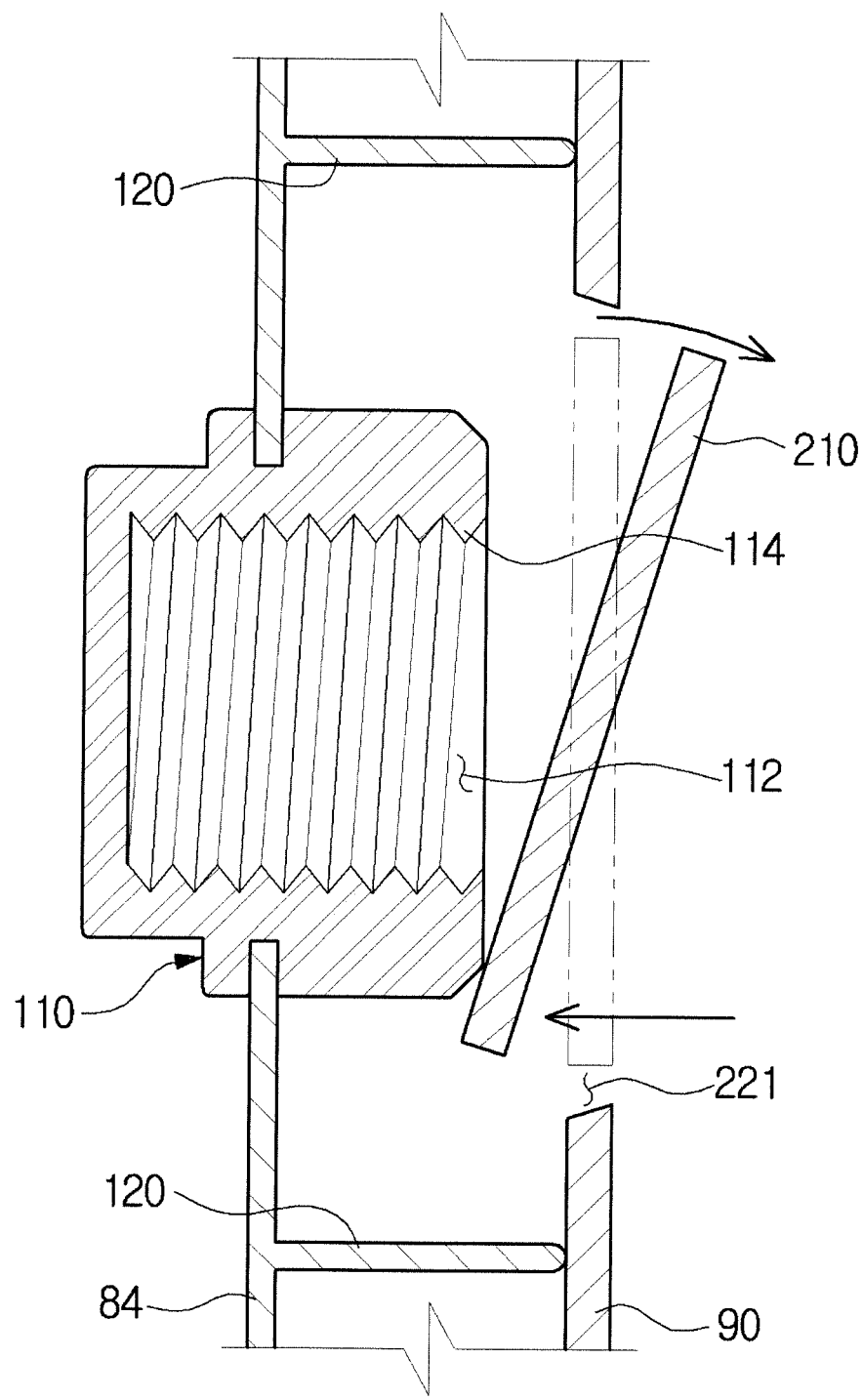

[Fig. 8]
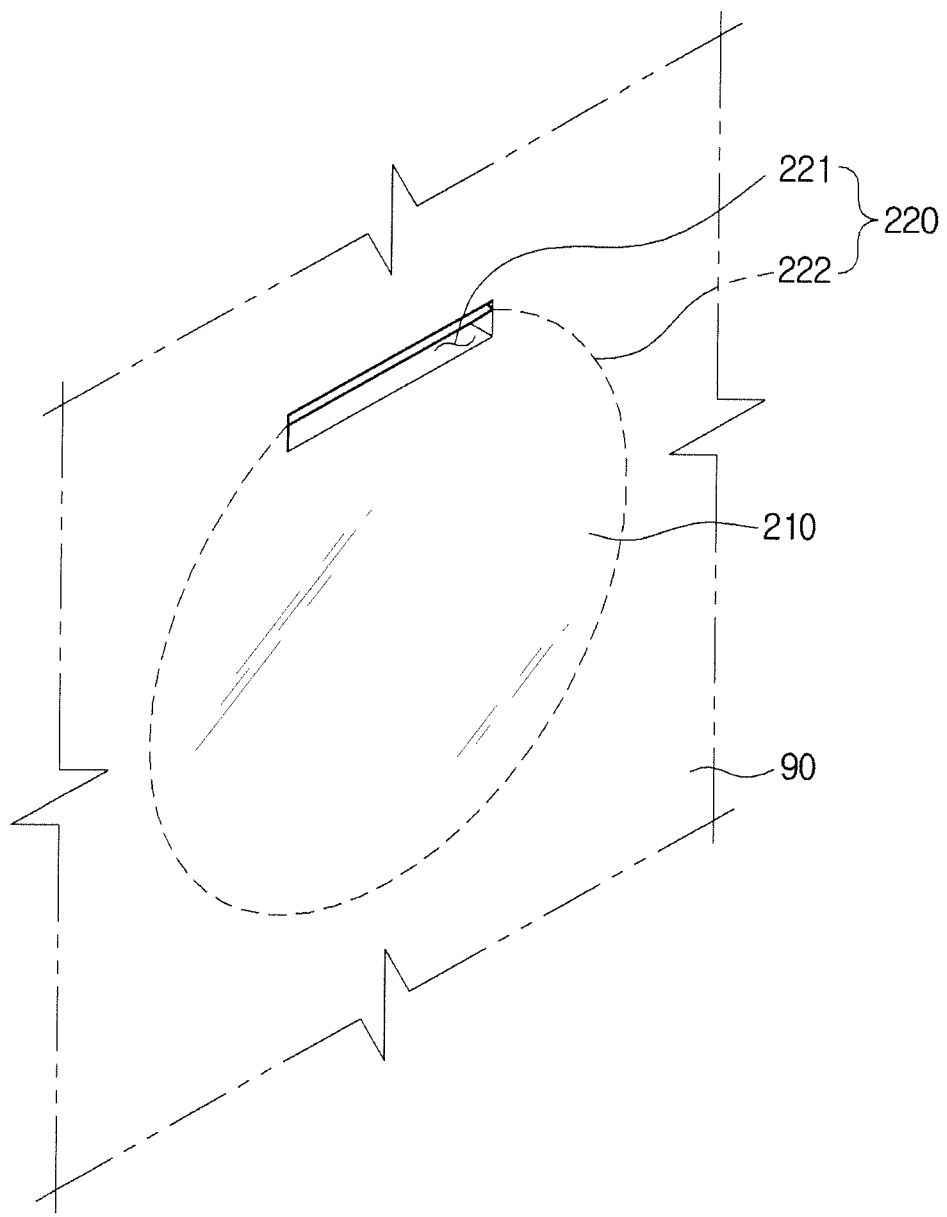

[Fig. 9]
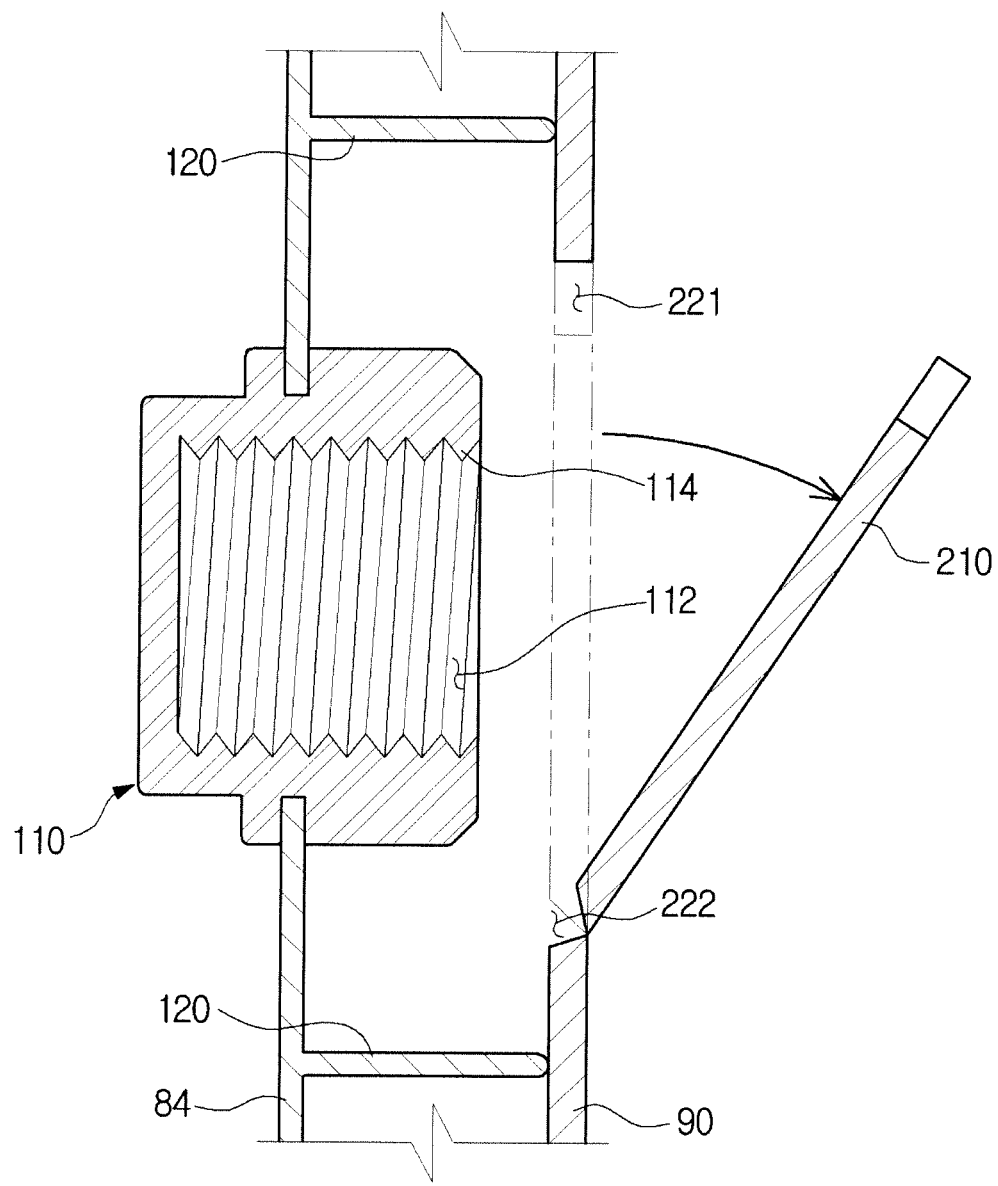

【Fig. 10】
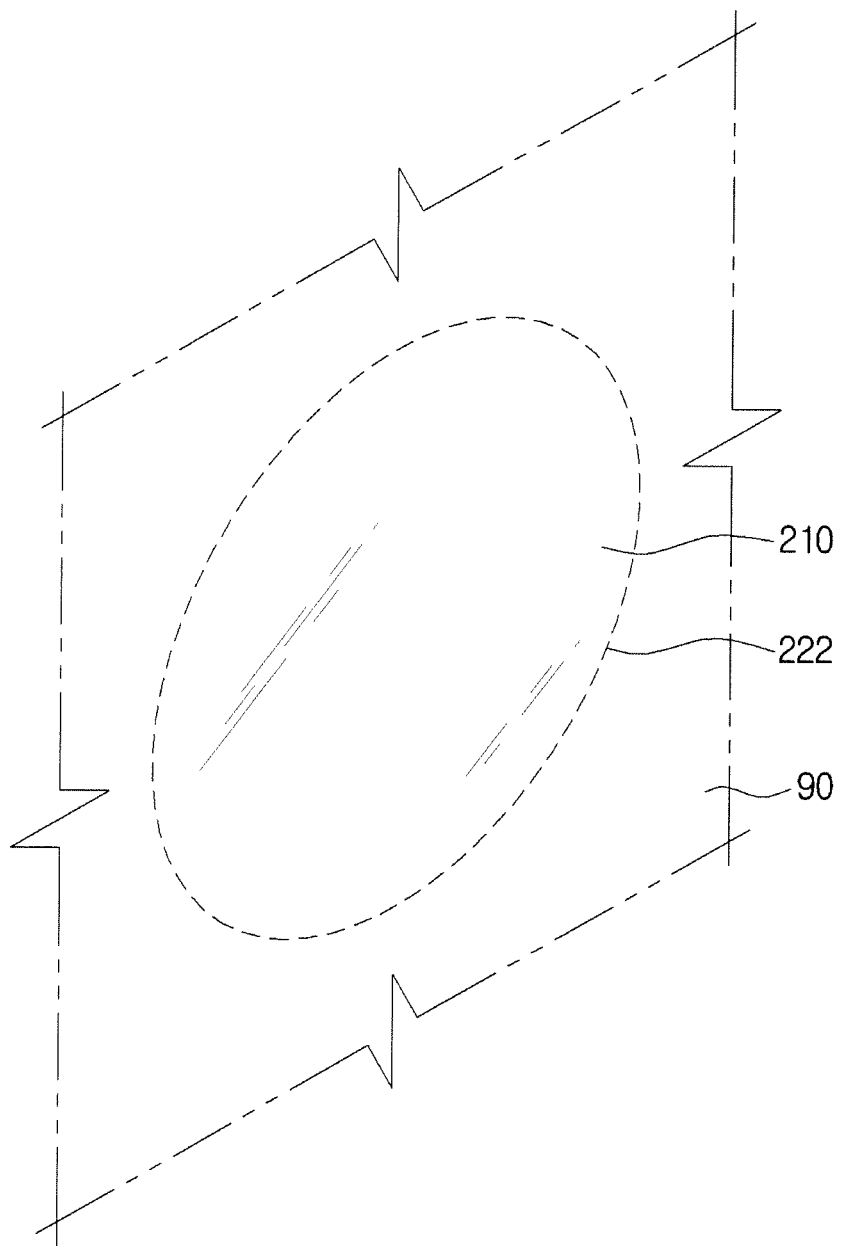

[Fig. 11]
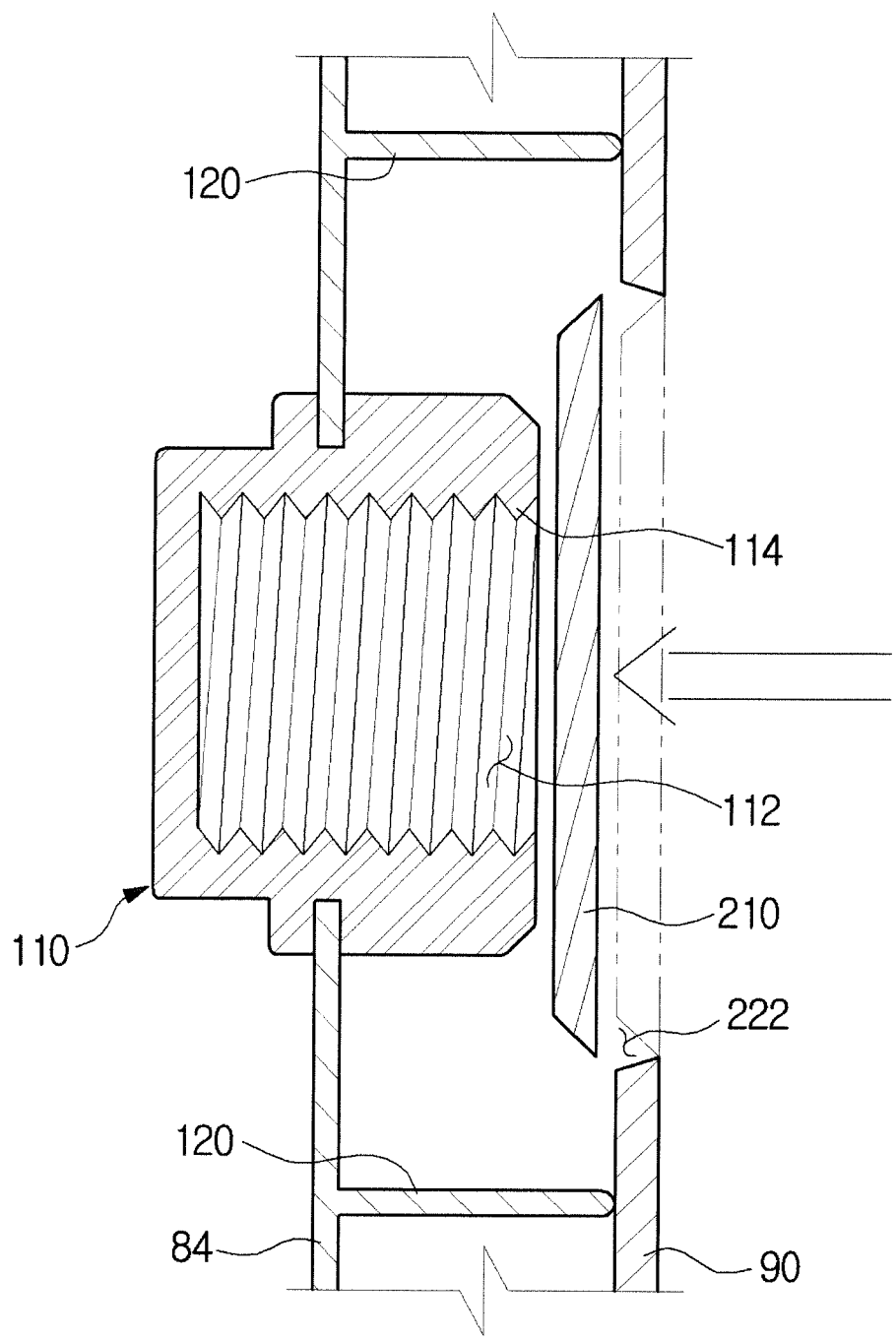

[Fig. 12]
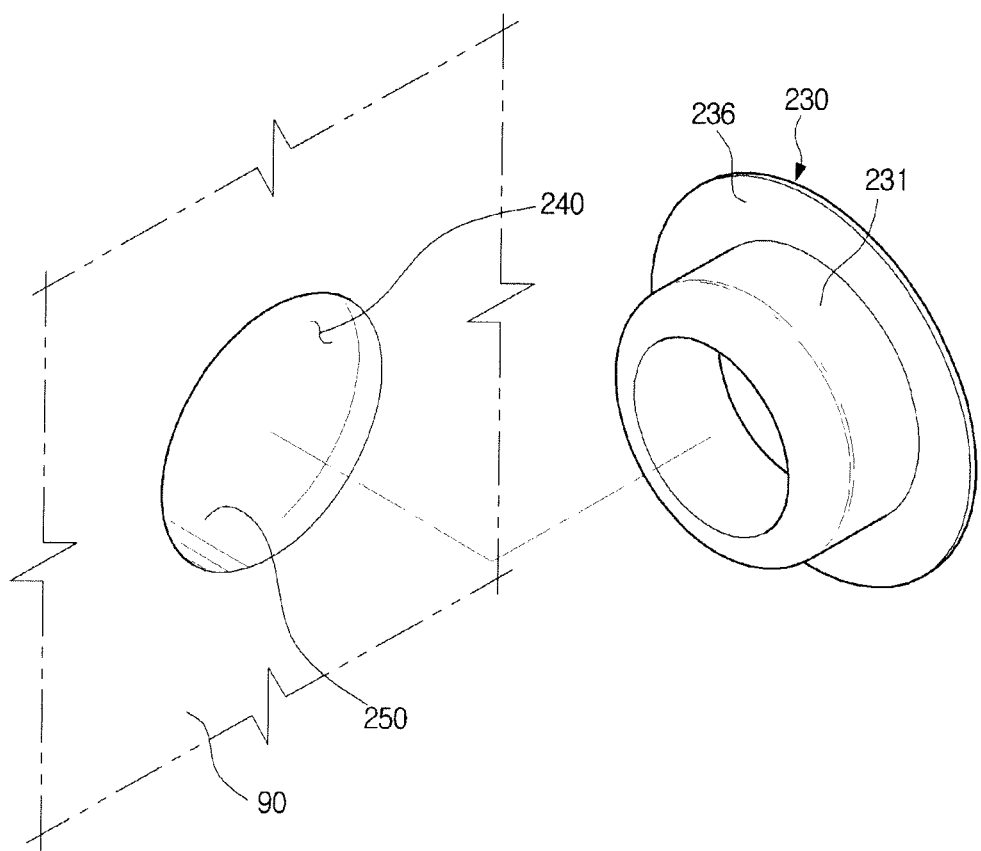

[Fig. 13]
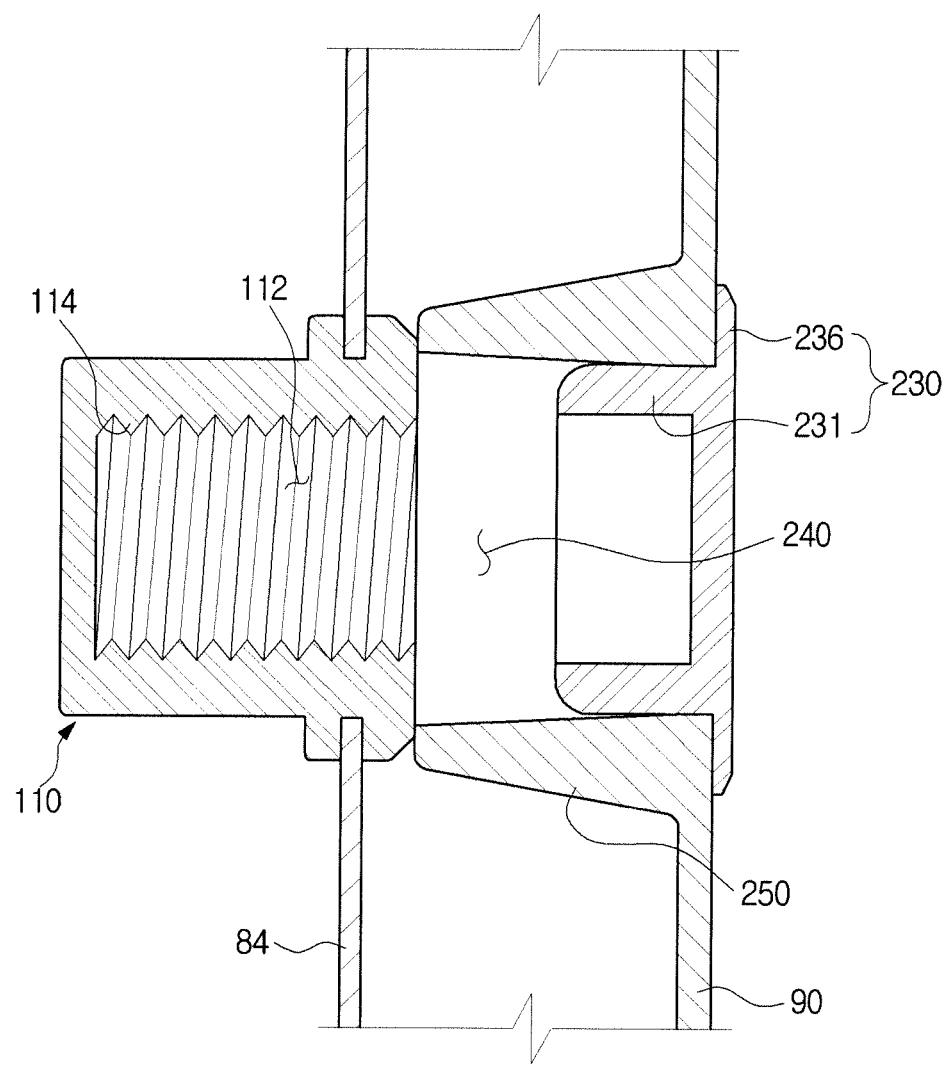

[Fig. 14]
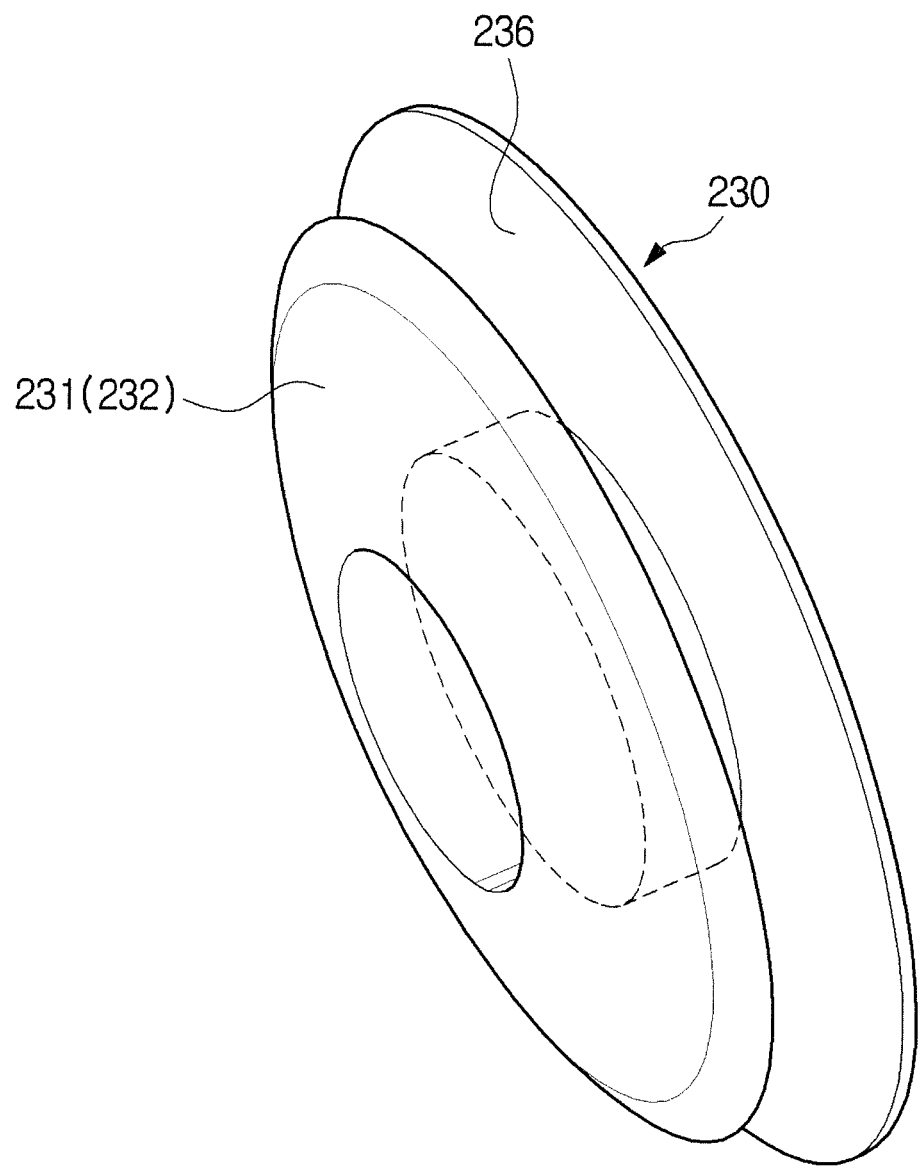

[Fig. 15]
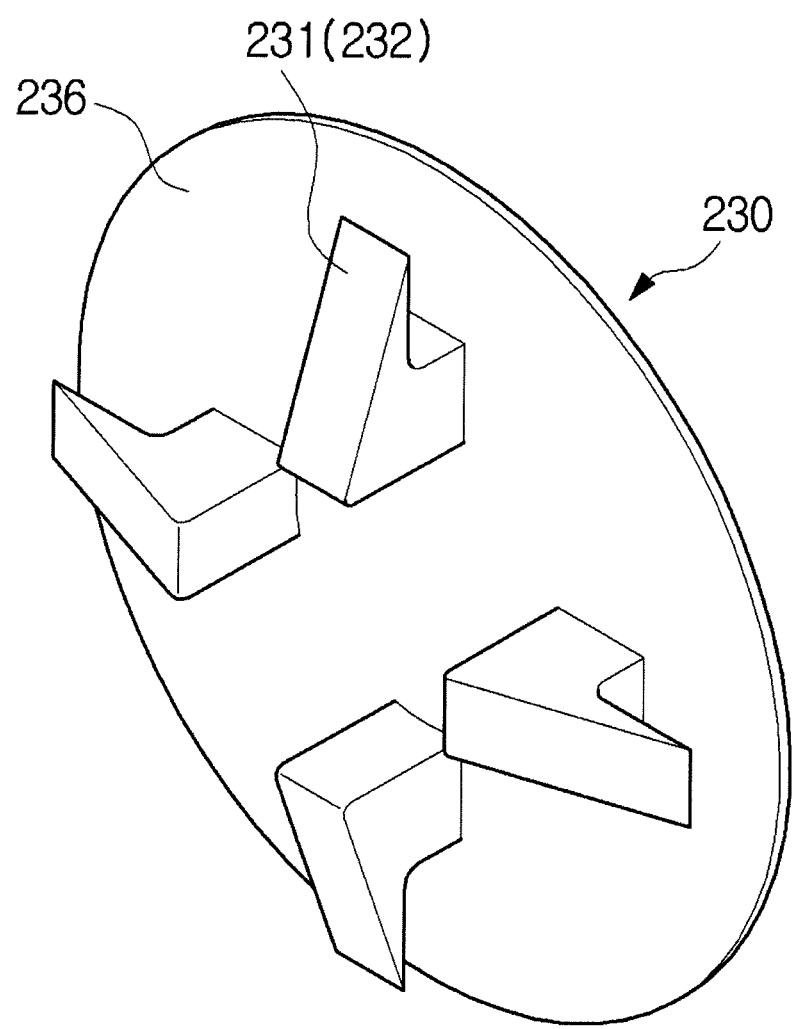

[Fig. 16]
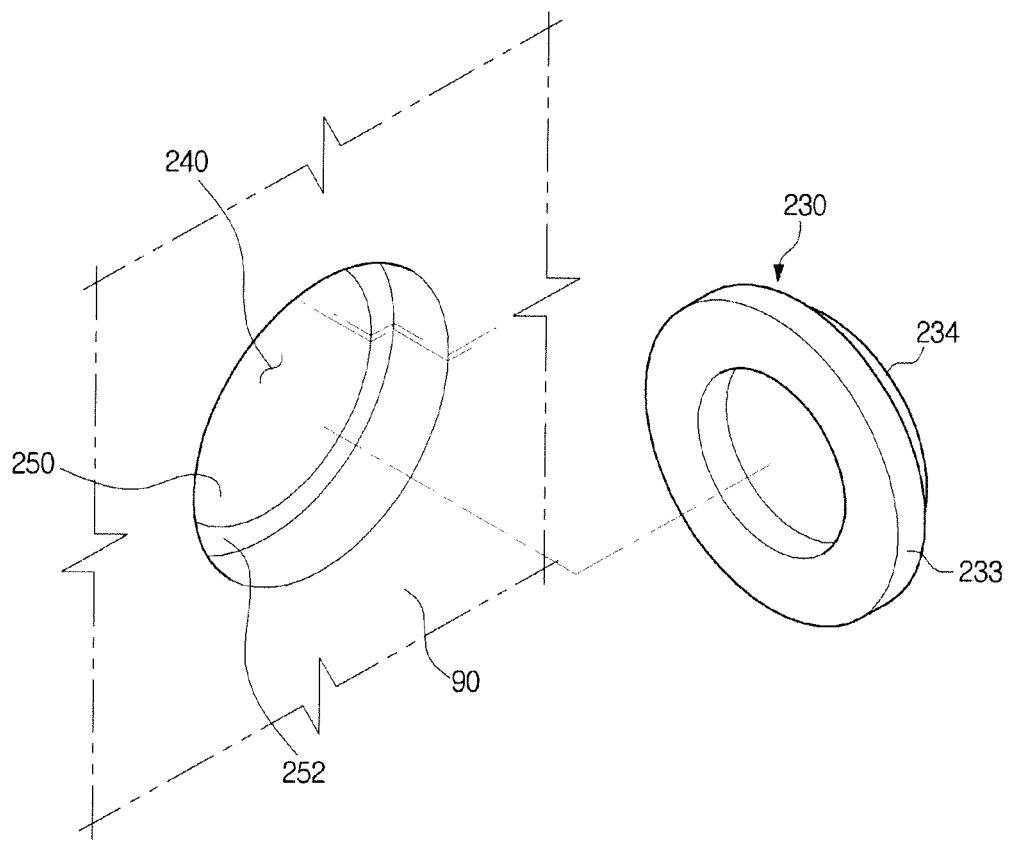

[Fig. 17]
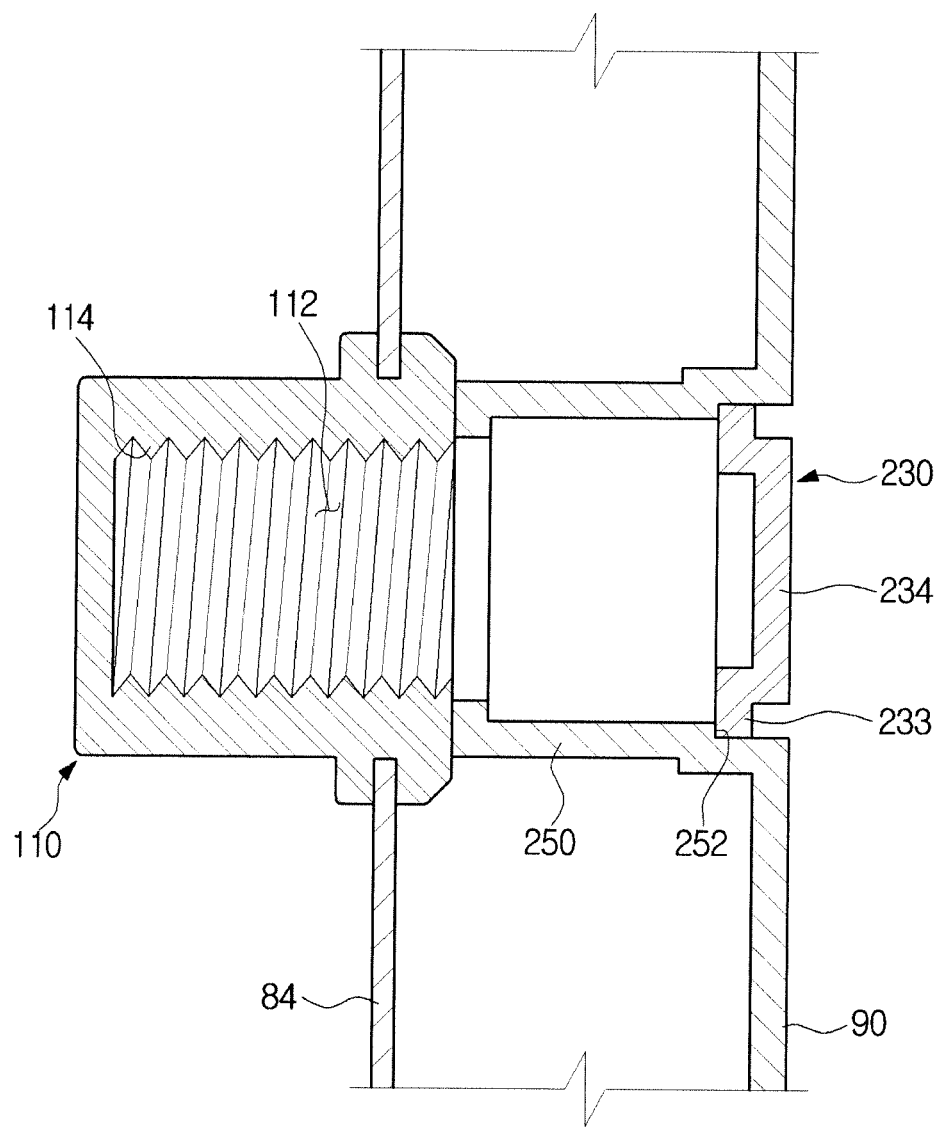

DISPLAY APPARATUS

CROSS-REFERENCE TO RELATED APPLICATIONS

This application is a National Phase Application under 35 U.S.C. § 371 of PCT International Patent Application No. PCT/KR2016/014177, filed Dec. 5, 2016 which claims the foreign priority benefit under 35 U.S.C. § 119 to Korean Patent Application No. 10-2015-0186560 filed Dec. 24, 2015, the contents of which are incorporated herein by reference.

TECHNICAL FIELD

The present disclosure relates to a display apparatus, more particularly, to a display apparatus having a structure for concealing a mounting structure to prevent the mounting structure from being exposed to the outside, wherein the mounting structure is used when the display apparatus is installed on a wall.

BACKGROUND ART

A display apparatus is an output device that converts electrical information into visual information and displays it to a user, and may include a television, a monitor device, and the like.

Such a display apparatus may be installed on a floor or a table using a stand, and as a screen becomes larger and thinner in recent years, the display apparatus may be also directly installed on a wall.

In general, a display apparatus may be fixed to a wall surface by a fastening member such as a screw.

A display apparatus may include a mounting structure for engaging with a fastening member such as a screw. For example, four or more mounting holes may be formed on the back surface of the display apparatus according to the Video Electronics Standards Association (VESA). In addition, four or more mounting holes may be formed on the back surface of the display apparatus without following the VESA standard.

When a display apparatus including a structure for mounting on a wall is installed on a table-like mounting surface without being fixed to a wall, the mounting hole may be exposed to the exterior of the display apparatus, and it leads to the adverse effect on the appearance of the display apparatus.

DISCLOSURE

Technical Problem

The present disclosure is directed to providing a display apparatus having an improved structure such that a mounting hole for installing the display apparatus on a wall is not visible from the outside.

Further, the present disclosure is directed to providing a display apparatus having a concealing member for concealing a mounting hole after disengaging the display apparatus fixed to the wall, wherein the mounting hole is used to install the display apparatus on a wall surface.

Technical Solution

One aspect of the present disclosure provides a display apparatus including a chassis disposed at a rear side of a display panel to support the display panel; a cover coupled to a rear side of the chassis to cover the chassis; a mounting unit provided on the chassis; and a concealing unit provided on the cover and configured to be removed from the cover to expose the mounting unit.

The concealing unit may include a concealing portion formed integrally with the cover and configured to conceal the mounting unit; and a removing guide portion provided to facilitate removal of the concealing portion.

The concealing unit may include an exposing hole formed in the cover; and a closing member closing the exposing hole.

The mounting unit may include a mounting hole configured to be couplable with a fastening member; and a blocking wall provided around the mounting hole to prevent the removed concealing unit or foreign substance from entering the inside of the cover.

The removing guide portion may include at least one of a slit and a guide groove provided along a circumference of the concealing portion.

The removing guide portion may include at least one slit. The concealing portion may be configured to be removable by inserting a separate member into the at least one slit.

The removing guide portion may include at least two slits. The concealing portion may be configured to be removable by rotating the concealing portion.

The removing guide portion may include at least one guide groove formed along the circumference of the concealing portion where the at least one slit is not formed.

The guide groove may be furrowed along the circumference of the concealing portion to be thinner than the thickness of the cover.

The removing guide portion may include at least one guide groove. The concealing portion may be configured to be removable by being pressed.

The closing member may be formed of an adhesive tape.

The closing member may include an insertion portion inserted into the exposing hole; and a head portion supported by the cover.

The insertion portion may include an escape-resistant structure configured to facilitate entry only in an insertion direction.

The concealing unit may include a side wall extending from the circumference of the exposing hole of the cover in a direction toward the chassis. The side wall may be provided with a protruding portion to restrict entry of the closing member.

The closing member may include a supporting portion supported by the protruding portion; and a handle portion configured to facilitate disengaging the closing member.

Another aspect of the present disclosure provides a display apparatus including a chassis disposed at a rear side of a display panel to support the display panel; and a cover coupled to a rear side of the chassis to cover the chassis, wherein the chassis includes a mounting hole for mounting the display apparatus on a mounting surface, and the cover is provided to conceal the mounting hole and to be removed in the process of mounting the display apparatus on the mounting surface.

The chassis may include an exposing hole for exposing the mounting hole, the concealing member may close the exposing hole, and the concealing member may be provided to be removed when the display apparatus is mounted on the installation surface, and be coupled again when the display apparatus is detached from the installation surface.

The chassis may include a blocking wall formed around the mounting hole or the cover may include a side wall formed around the exposing hole so that foreign substances do not enter the inside of the cover through the exposing.

Another aspect of the present disclosure provides a method of installing a display apparatus including removing a concealing member provided on a cover coupled to a chassis supporting a display panel so that a mounting hole provided on the chassis is exposed; and connecting and fixing the mounting hole to the mounting surface by a fastening member.

The method of installing the display apparatus may include at least one step of removing a concealing member by inserting a separate member into a slit provided around the concealing member, removing the concealing member by rotating the concealing member, and removing the concealing member by pressing the concealing member.

The method of installing the display apparatus may include disassembling the fastening member and the mounting hole, coupling the concealing member to the cover to conceal the mounting hole, and fixing the stand to the cover or the chassis and standing on the installation surface.

Advantageous Effects

It is possible to protect a mounting hole from damage, prevent foreign substance such as dust from entering into the display apparatus, and improve the appearance aesthetics of the display apparatus by a concealing structure configured to hide the mounting hole for wall mounting.

Further, since a concealing member for hiding a mounting hole may be removed when a display apparatus is fixed to a wall, and the concealing member may be mounted on the display apparatus to hide the mounting hole again when the display apparatus is detached from the wall, it is possible to conceal the mounting hole for wall mount when the display apparatus is moved or an installation location thereof is changed.

DESCRIPTION OF DRAWINGS

FIG. 1 is a perspective view illustrating a display apparatus according to one embodiment of the present disclosure.

FIG. 2A is an exploded perspective view illustrating the display apparatus according to one embodiment of the present disclosure.

FIG. 2B is an exploded perspective view illustrating a part of a display module of the display apparatus according to one embodiment of the present disclosure.

FIG. 2C is a cross-sectional view illustrating a part of the display module of the display apparatus according to one embodiment of the present disclosure.

FIG. 3 is a view illustrating a display apparatus in which a cover is removed according to one embodiment of the present disclosure.

FIG. 4 is an enlarged view illustrating a concealing unit provided on the cover in the display apparatus according to one embodiment of the present disclosure.

FIG. 5 is a cross-sectional view illustrating a mounting unit provided on a chassis and the concealing unit provided on the cover in the display apparatus according to one embodiment of the present disclosure.

FIG. 6 is an enlarged view illustrating a concealing unit provided on a cover in a display apparatus according to another embodiment of the present disclosure.

FIG. 7 is a cross-sectional view illustrating a mounting unit provided on a chassis and a concealing unit provided on a cover in a display apparatus according to another embodiment of the present disclosure.

FIG. 8 is an enlarged view illustrating a concealing unit provided on a cover in a display apparatus according to still another embodiment of the present disclosure.

FIG. 9 is a cross-sectional view illustrating a mounting unit provided on a chassis and a concealing unit provided on a cover in a display apparatus according to still another embodiment of the present disclosure.

FIG. 10 is an enlarged view illustrating a concealing unit provided on a cover in a display apparatus according to still another embodiment of the present disclosure.

FIG. 11 is a cross-sectional view illustrating a mounting unit provided on a chassis and a concealing unit provided on a cover in a display apparatus according to still another embodiment of the present disclosure.

FIG. 12 is an enlarged view illustrating a concealing unit provided on a cover in a display apparatus according to still another embodiment of the present disclosure.

FIG. 13 is a cross-sectional view illustrating a mounting unit provided on a chassis and a concealing unit provided on a cover in a display apparatus according to still another embodiment of the present disclosure.

FIG. 14 is a view illustrating a closing member in a display apparatus according to still another embodiment of the present disclosure.

FIG. 15 is a view illustrating a closing member in a display apparatus according to still another embodiment of the present disclosure.

FIG. 16 is an enlarged view illustrating a concealing unit provided on a cover in a display apparatus according to still another embodiment of the present disclosure.

FIG. 17 is a cross-sectional view illustrating a mounting unit provided on a chassis and a concealing unit provided on a cover in a display apparatus according to still another embodiment of the present disclosure.

MODES OF THE INVENTION

Embodiments described in this specification and configurations illustrated in drawings are only exemplary examples of the present disclosure, and there may be various modifications that may substitute for the embodiments and the drawings in the specification at the time of this application's filing.

Further, the same reference number or symbols disclosed in each of the drawings of the specification denote identical components or configurations which perform substantially the same functions.

Terms used in the specification are only used to describe specific exemplary embodiments and do not limit the present disclosure. Singular forms used herein are intended to include plural forms unless explicitly indicated otherwise. It should be further understood that the terms "includes", "comprises", or "have" used in this specification specify the presence of stated features, numerals, steps, operations, components, parts, or a combination thereof, but do not preclude the presence or addition of one or more other features, numerals, steps, operations, components, parts, or a combination thereof.

It will be understood that, although the terms first, second, third, etc., may be used herein to describe various components, these components should not be limited by these terms. These terms are only used to distinguish one component from another. For example, a first component may also be called a second component, while the second component may be called a first component. Descriptions shall be understood as to include any and all combinations of one or more of the associated listed items when the items are described by using the conjunctive term "~ and/or ~," or the like.

The terms "front end", "rear end", "upper", "lower", "upper end", "lower end", etc., used herein are defined based on the drawings, and the shapes and positions of corresponding components are not limited by the terms.

Hereinafter, embodiments according to the present disclosure will be described in detail with reference to the accompanying drawings. In the following description, a display apparatus according to an exemplary embodiment is assumed to be a flat display apparatus. However, exemplary embodiments can be applied to a curved display apparatus and a bendable or flexible display that can be variable between a curved state and a flat state.

The display apparatus formed to have a curvature can enhance a user's immersion in images displayed on the screen. A display apparatus having the curvature may be implemented with a display panel having a curvature. Alternatively, the display apparatus having the curvature may be implemented using a chassis that supports a flat display panel and has a curvature.

FIG. 1 is a perspective view illustrating a display apparatus according to one embodiment of the present disclosure, FIG. 2A is an exploded perspective view illustrating the display apparatus according to one embodiment of the present disclosure. FIG. 2B is an exploded perspective view illustrating a part of a display module of the display apparatus according to one embodiment of the present disclosure.

As shown in FIGS. 1 to 2C, a display apparatus 1 may include a display module 10, and at least one circuit board 86 electrically connected to the display module 10.

The at least one circuit board 86 may include a power board, a signal processing board, and a driving board. A circuit device for supplying power to the display module 10 may be mounted on the power board. Also, on the signal processing board, a circuit device for receiving external signals and processing them may be mounted. The driving board may be used to drive the display module 10. The power board, the signal processing board, and the driving board may be disposed separately or integrally.

The display module 10 may include a display panel 20 on which images are displayed, a backlight unit, and a chassis 80. The backlight unit may include optical members, such as a light source 30 and a light guide plate 40. That is, the display module 10 may include the light source 30 disposed behind the display panel 20, and the light guide plate 40 to guide light emitted from the light source 30 to the display panel 20, as an edge type backlight unit. The light guide plate 40 may convert light emitted from the light source 30 into a surface light source and guide the surface light source toward the display panel 20.

The backlight unit further may include an optical member such as a sheet member. The sheet member may include an optical sheet 60 having optical properties, and a Quantum Dot (QD) sheet 50 configured to improve color reproduction.

The optical sheet 60 may include a diffuser sheet 61 configured to diffuse incident light, and a Dual Brightness Enhancement Film (DBEF) sheet 62 that is a high brightness prism sheet.

The optical sheet 60 may be disposed between the light guide plate 40 and the display panel 20 to change the optical properties of light exiting from the light guide plate 40.

The QD sheet 50 may be used to improve color reproduction. The color reproduction is a standard for representing similarity to natural colors, and shows how a wide range of colors is represented on color coordinates. Because color purity of white light is high compared to a technology of converting white LEDs into a color filter, the efficiency of transmission through a color filter may be high, which can increase the total power efficiency of the display apparatus. The QD sheet 50 is also called a "quantum dot sheet."

Quantum dots will be described as follows. If electrons that have been in a valence band receive energy, they are excited to a conduction band. Thereafter, the electrons again lose their energy to fall to the valance band, and at this time, the energy is emitted as light. The quantum dots generate strong fluorescence in a narrow wavelength band, and can generate all colors of visible light according to their sizes. Also, because the quantum dots can themselves generate natural colors, the quantum dots show high color reproduction without color loss. The quantum dots generate light of a shorter wavelength at smaller particles, and light of a longer wavelength at larger particles. The quantum dots may be a compound, such as cadmium selenide (CdSe), cadmium sulfide (CdS), cadmium telluride (CdTe), zinc selenide (ZnSe), zinc telluride (ZnTe), and zinc sulfide (ZnS).

The QD sheet 50 may make light passed through the light guide plate 40 exit therethrough. The QD sheet 50 may closely contact the front surface of the light guide plate 40. That is, the QD sheet 50 may closely contact the front surface of the light guide plate 40 to pass light exiting from the light guide plate 40 therethrough.

Because light from LEDs 30a arrives at the QD sheet 50 via the light guide plate 40, the QD sheet 50 may be less influenced by heat from the LEDs 30a, resulting in ensuring high reliability.

The QD sheet 50 may be a yellow QD sheet 50, in correspondence to a blue light emitting device. Blue light emitted from a blue light emitting diode may pass through the yellow QD sheet 50 to be converted into white light.

The light guide plate 40 includes a light guide part 40a and a reflector 45. The reflector 45 may be a separate sheet.

The chassis 80 may function to support the display panel 20. The chassis 80 may include a first chassis 82, and a second chassis 84 disposed behind the first chassis 82. In other words, the first chassis 82 may be disposed at least one among the front side or a lateral side of the display panel 20. For example, the first chassis 82 may be disposed to cover a part of the front surface of the display panel 20. Alternatively, the first chassis 82 may be disposed to cover the lateral sides of the display panel 20. Alternatively, the first chassis 82 may be disposed to cover a part of the front surface of the display panel 20 and the lateral sides of the display panel 20. The second chassis 84 may be disposed in at least one among the rear surface and lateral sides of the display panel 20. The second chassis 84 may be disposed in the rear surface of the display panel 20. If the first chassis 82 is disposed to cover a part of the front surface of the display panel 20, the second chassis 84 may be disposed in the lateral sides and rear surface of the display panel 20. If the first chassis 82 is disposed to cover the lateral sides of the display panel 20, the second chassis 84 may be disposed in the rear surface of the display panel 20. If the first chassis 82 is disposed to cover a part of the front surface of the display panel 20 and the lateral sides of the display panel 20, the second chassis 84 may be disposed behind the display panel 20. The first chassis 82 may be coupled with the second chassis 84 to support the display panel 20. The first chassis 82 and the second chassis 84 may be integrated into one body to support the display panel 20.

The light source 30 may be disposed around at least one among the edges of the light guide plate 40 to irradiate light.

The light source 30 may be disposed along the shorter or longer side of the light guide plate 40. That is, the light source 30 can be positioned at any location as long as it is disposed along at least one among the edges of the light guide plate 40 to irradiate light to the light guide plate 40. Also, the light source 30 may be disposed in at least one lateral side of the display module 10 and inside the chassis 80. For example, a pair of light sources 30 may be respectively disposed at both lateral sides of the display module 10, as shown in FIG. 2A, or the light source 30 may be disposed at one lateral side of the display module 10, as shown in FIG. 2B.

The display module 10 may further include a middle mold 70 in which at least one part of the components disposed inside the chassis 80 is rested, together with the chassis 80.

The first chassis 82 may include a bezel part 82a to cover the edges of the front surface of the display panel 20, and a top side part 82b extending backward from the bezel part 82a to cover the lateral sides of the middle mold 70.

The second chassis 84 may include a bottom part 84a, and a bottom side part 84b extending forward from the edges of the bottom part 84a and coupled with the middle mold 70 to be located inside the middle mold 70.

In front of the middle mold 70, the display panel 20 and the first chassis 82 may be disposed, and behind the middle mold 70, the second chassis 84 may be disposed to support the individual components. Also, the middle mold 70 may separate the display panel 20 from the second chassis 84 to prevent heat generated from the light source 30 from being transferred to the display panel 20 through the second chassis 84.

The middle mold 70 may be configured to support the optical sheet 60 and/or the display panel 20 while fixing the light guide plate 40 and the QD sheet 50. The middle mold 70 may include a middle body 72 and a pressure rib 74.

The middle body 72 may be coupled with the second chassis 84. The middle body 72 may be coupled with the second chassis 84 along the edges of the second chassis 84. The middle body 72 may include a first body coupling part 72a coupled with the outside portion of the bottom side part 84b of the second chassis 84, and a second body coupling part 72b coupled with the inside portion of the bottom side part 84b of the second chassis 84. Through this structure, the middle mold 70 is coupled with the second chassis 84 such that the bottom side part 84b of the second chassis 84 is positioned between the first body coupling part 72a and the second body coupling part 72b.

The pressure rib 74 extends from the middle body 72 such that the end of the pressure rib 74 is positioned in front of the light guide plate 40 and the QD sheet 50. When the middle mold 70 is coupled with the second chassis 84, the pressure rib 74 may press the QD sheet 50 and the light guide plate 40 toward the second chassis 84 so that the QD sheet 50 can closely contact the light guide plate 40. At least one part of the pressure rib 74 is positioned along the edges of the QD sheet 50 and the light guide plate 40.

Light emitted from the light source 30 may be reflected from the reflector 45 provided on the bottom part 84a of the second chassis 84, and then guided to the display panel 20. That is, the reflector 45 may guide light irradiated from the light source 30 to the display panel 20.

The light source 30 may include a plurality of LEDs 30a. The light source 30 may be formed with the plurality of LEDs 30 arranged at regular intervals. The light source 30 may be disposed along one edge of the light guide plate 40. The LEDs 30a may include blue LEDs. The light source 30 may further include a circuit board 30b. The circuit board 30b may send electrical signals to the LEDs 30a to turn on/off the LEDs 30a. The LEDs 30a may be aligned on the circuit board 30b to operate. The light source 30 may be disposed in both spaces formed between the light guide plate 40 and the inner surface of the second chassis 84, that is, along the bottom side part 84b of the second chassis 84. Accordingly, light emitted from the light source 30 may be irradiated to the bottom part 84a of the second chassis 84 through a space formed between the light guide plate 40 and the bottom part 84a of the second chassis 84.

The light guide plate 40 may include the reflector 45 attached on the rear surface thereof. The light guide plate 40 may include the light guide part 40a and the reflector 45. The reflector 45 may be positioned on the rear surface of the light guide plate 40 so that light emitted from the light source 30 can be transmitted forward. In other words, the reflector 45 may reflect light emitted from the light source 30 toward the display panel 20.

The reflector 45 may be in the shape of a reflecting plate or in the shape of a reflecting sheet. Also, the reflector 45 may be separated from the light guide plate 40 and disposed on the rear surface of the light guide plate 40, or the reflector 45 may be integrated into the light guide plate 40. Also, by reflection coating the rear surface of the light guide plate 40, the same effect as the reflector 45 can be obtained.

The light guide plate 40 may be configured to transmit light emitted from the light source 30. The light guide plate 40 may be made of a transparent resin material to transmit light emitted from the light source 30. The light guide plate 40 may be spaced by a predetermined distance from the light source 30 to reduce deformation due to heat generated by the light source 30.

The display module 10 may further include a cover 90 forming the rear surface of the display module 10. The cover 90 may be disposed behind the second chassis 84 to be opposite to the second chassis 84. The cover 90 may be disposed behind the second chassis 84 in such a way to cover at least one part of the second chassis 84. The cover 90 may be removably coupled with the second chassis 84 to form the outer appearance of the display apparatus 1 together with the first chassis 82. The cover 90 may be removably coupled with the second chassis 84 in a snap button fashion.

The display apparatus 1 may further include a stand 12. The stand 12 may be configured to support the display module 10. The stand 12 may be removably coupled with the display module 10. The stand 12 may be removably coupled with the second chassis 84 in the snap button fashion. Accordingly, when a user wants to stand the display apparatus 1 on an installation surface such as a table, the user can couple the display module 10 with the stand 12. When the user wants to fix the display apparatus 1 on an installation surface such as a wall, the user can decouple the display module 10 from the stand 12. The stand 12 may include a support plate 16 that faces an installation surface.

The display apparatus 1 according to one embodiment can be used as a stand type display that stands on an installation surface such as a table, or as a wall mounted type display that is hung on an installation surface such as a wall. When a user wants to use the display apparatus 1 as a stand type display, the user can couple the display module 10 with the stand 12.

When a user wants to use the display apparatus 1 as the wall mounted type display, the user can decouple the display module 10 from the stand 12 and then hang the display module 10 on an installation surface. To use the display apparatus 1 as the wall mounted display, a structure for fixing the display apparatus 1 on an installation surface may be formed in the rear part of the display apparatus 1.

FIG. 3 is a view illustrating a display apparatus in which a cover is removed according to one embodiment of the present disclosure, FIG. 4 is an enlarged view illustrating a concealing unit provided on the cover in the display apparatus according to one embodiment of the present disclosure, and FIG. 5 is a cross-sectional view illustrating a mounting unit provided on the chassis and the concealing unit provided on the cover in the display apparatus according to one embodiment of the present disclosure.

Referring to FIGS. 3 to 5, at least one wall mounting structure may be provided on the rear surface of the display module 10 of the display apparatus 1 according to an embodiment of the present disclosure. The mounting structure may include at least one mounting unit 200 provided at the second chassis 84 and a concealing unit 100 provided at the cover 90.

When the display apparatus 1 according to an embodiment of the present disclosure is used as a stand-type display apparatus, the concealing unit 100 provided at the cover 90 conceals the mounting unit 200, and when the display apparatus 1 according to an embodiment of the present disclosure is used as a wall-mounted display apparatus, the concealing unit 100 provided at the cover 90 may be removed so that the mounting unit 200 provided at the second chassis 84 is exposed.

Particularly, referring to FIG. 3, the mounting unit 200 including four or more mounting holes 112 according to the VESA standard may be formed at the second chassis 84 of the display apparatus 1. In addition, four or more mounting holes 112 may be formed at the second chassis 84 other than the VESA standard. The concealing unit 100 may be provided at the cover 90 to correspond to the mounting unit 200 provided at the second chassis 84.

Referring to FIGS. 4 and 5, the concealing unit 100 provided at the cover 90 may include a concealing portion 210 for concealing the mounting unit 200 provided at the second chassis 84 and a removing guide portion 220 provided to facilitate removal of the concealing portion 210.

The concealing portion 210 may be integrally formed with the cover 90. In addition, the concealing portion 210 may have a larger diameter than the diameter of the mounting hole 112 so that the mounting hole 112 of the mounting unit 200 may be exposed when the concealing portion 210 is removed from the cover 90. That is, the diameter of an exposing hole, which is formed in the cover 90 by removing the concealing portion 210, may be larger than the diameter of the mounting hole 112.

The removing guide portion 220 may be formed around the concealing portion 210 to facilitate removal of the concealing portion 210 from the cover 90. The removal guide portion 220 may include a discontinuous slit 221 that is cut out along the periphery of the concealing portion 210. In addition, the removing guide portion 220 may include a guide groove 222 having a furrow shape formed along the circumference of the concealing portion 210 such that the thickness of the circumference of the concealing portion 210 is smaller than the thickness of the cover 90. That is, the guide groove 222 may be provided with a notch along the periphery of the concealing portion 210 on the inner surface of the cover 90.

When at least one slit 221 is included in the removing guide portion 220, a separate tool or the like may be inserted into the slit 221 to easily remove the concealing portion 210. In addition, when the guide groove 222 is formed between the slits 221, the concealing portion 210 may be removed by pressing the concealing portion 210 without any additional tool.

The removing guide portion 220 may include at least one of the slit 221 and the guide groove 222. FIG. 4 shows the concealing unit 100 including four slit 221 formed along the circumference of the concealing portion 210 and guide grooves 222 formed between the slits.

Referring to FIG. 5, the mounting unit 200 provided at the second chassis 84 may include a mounting hole 112 and a blocking wall 120. The mounting hole 112 may include a thread 114 formed on the inner wall of the mounting hole 112 so as to engage with a fastening member such as a screw. The mounting hole 112 may be formed integrally with the second chassis 84. Alternatively, the mounting hole 112 may be formed in a separate rigid member 110 and then the rigid member 110 is coupled to the second chassis 84.

The blocking wall 120 may be formed around the mounting hole 112 so that a foreign substance such as dust entering through the slit 221, a removed concealing portion 210, or the like do not enter the inside of the cover 90. The blocking wall 120 may be formed to protrude from the second chassis 84 and may extend a distance that the second chassis 84 and the cover 90 are spaced apart when the cover 90 is coupled to the second chassis 84.

FIGS. 6 to 11 illustrate various embodiments of a concealing unit and a mounting unit.

Referring to FIGS. 6 and 7, a removing guide portion 220 of a concealing unit 100 may include two slits 221 formed along the circumference of a concealing portion 210. The slits 221 may be formed symmetrical to each other along the circumference of the concealing portion 210. In addition, the slits may be formed so as to be close to each other in the circumferential direction of the concealing portion 210. In this case, the concealing portion 210 may be removed by rotating the concealing portion 210 to cut the connecting portion between the concealing portion 210 and a cover 90.

Referring FIGS. 8 and 9, a removing guide portion 220 of a concealing unit 100 may include a slit 221 formed at a part of the circumference of a concealing portion 210 and a guide groove 222 formed along the circumference of the concealing portion 210 except for the portion where the slit 221 is formed. The slit 221 may be formed in a straight line shape to facilitate insertion of a separate tool or the like.

Referring to FIGS. 10 and 11, a removing guide portion 220 of a concealing unit 100 may include only a guide groove 222 formed along the circumference of a concealing portion 210. The outer surface of the cover 90 may be marked with laser machining or the like to indicate a position of the concealing portion 210. If only the guide groove 222 is formed as the removing guide portion 220, the concealing portion 210 may be removed by pressing the concealing portion. In this case, the blocking wall 120 may serve to support the outer periphery of the concealing portion 210 on the inner side of the cover 90 so as to facilitate the pressurization.

As seen in the various embodiments, the removing guide portion 220 of the concealing unit 100 may include at least one of at least one guide groove 222 and at least one slit 221. Also, the guide groove 222 and the slit 221 may be formed in various shapes other than those shown in the drawings.

FIG. 12 is an enlarged view illustrating a concealing unit provided on a cover in a display apparatus according to still another embodiment of the present disclosure, and FIG. 13 is a cross-sectional view illustrating a mounting unit provided on a chassis and a concealing unit provided on a cover in a display apparatus according to still another embodiment of the present disclosure.

Referring to FIGS. 12 and 13, a concealing unit provided at a cover 90 may include an exposing hole 240 formed in the cover 90 and a closing member 230 closing the exposing hole 240. The closing member 230 may include an insertion portion 231 inserted into the exposing hole 240 and a head portion 236 supported by the cover 90. The diameter of the insertion portion 231 may correspond to the diameter of the exposing hole 240 and the diameter of the head portion 236 may be larger than the diameter of the exposing hole 240.

The exposing hole 240 may be formed by a side wall 250 extending from the inner surface of the cover 90 toward the second chassis 84 and extending around the exposing hole 240. The exposing hole 240 has a diameter greater than the diameter of the mounting hole 112 of the mounting unit 200 so that the mounting hole 112 may be exposed when the closing member 230 is removed from the cover 90.

The mounting unit 200 provided at the second chassis 84 may include a mounting hole 112. The mounting hole 112 may include a thread 114 formed on the inner wall of the mounting hole 112 so as to engage with a fastening member such as a screw. The mounting hole 112 may be formed integrally with the second chassis 84. Alternatively, the mounting hole 112 may be formed in a separate rigid member 110 and then the rigid member 110 is coupled to the second chassis 84.

A side wall 250 of the exposing hole 240 may extend a distance between the second chassis 84 and the cover 90 when the cover 90 is coupled to the second chassis 84 or a distance between the fore-end of the exposing hole 240 and the mounting hole 112 so that a foreign substance such as dust entering through the exposing hole 240 does not enter the inside of the cover.

The closing member 230 shown in FIGS. 12 and 13 may include an elastic material such as rubber. The diameter of the insertion portion 231 of the closing member 230 is formed to correspond to the diameter of the exposing hole 240. The closing member 230 have a cavity formed inside the insertion portion 231 so that the insertion portion may be easily inserted into the exposing hole 240 by elastic deformation and the closing member 230 may not be freely removed from the exposing hole 240 due to the restoring force.

FIGS. 14 and 15 are views illustrating a closing member according to another embodiment of the present disclosure.

Referring to FIGS. 14 and 15, an insertion portion 231 of a closing member 230 may include an escape-resistant structure 232, which facilitates insertion of the insertion portion 231 into the exposing hole 240 and prevents the insertion portion 231 from being arbitrarily disengaged from the exposing hole 240.

The closing member 230 shown in FIG. 14 may be formed of a rubber material and the insertion portion 231 of the closing member 230 may include the escape-resistant structure 232 which is convexly protruded in the entering direction so that the insertion portion 231 may be easily entered only in the direction of insertion into the exposing hole 240. Since a cavity is formed inside the insertion portion 231, when the closing member 230 is removed, the insertion portion 231 may be elastically deformed by an external force and the closing member 230 may be detached from the exposing hole 240.

The closing member 230 shown in FIG. 15 may be formed of an ABS resin material. Since the ABS resin is stronger against impact and heat than ordinary plastic material, the insertion portion 231 may be divided into four parts so as to support the four sides of the side wall 250 of the exposing hole 240. It is a matter of course that the insertion portions 231 may be formed in any number of two or more. The insertion portion 231 may include an escape-resistant structure 232 that is inclined downward toward the center of the closing member 230 to facilitate entry into the exposing hole 240 only. Since a space is provided at the center of the plurality of insertion portions, when the closing member 230 is removed, the insertion portion 231 may be elastically deformed by an external force and the closing member 230 may be detached from the exposing hole 240.

In addition to the closing member having the shape shown in FIGS. 14 and 15, a closing member may be provided in various shapes and various materials. Also, although not shown in the drawings, the closing member may be formed of a tape capable of concealing the exposing hole. The tape as the closing member may have a larger area than the exposing hole 240 and may be provided so as to have the surface contacting the cover 90 with adhesiveness.

FIG. 16 is an enlarged view illustrating a concealing unit provided on a cover in a display apparatus according to still another embodiment of the present disclosure, and FIG. 17 is a cross-sectional view illustrating a mounting unit provided on a chassis and a concealing unit provided on a cover.

Referring to FIGS. 16 and 17, the concealing unit provided on the cover 90 may include an exposing hole 240 formed in the cover 90 and a closing member 230 closing the exposing hole 240. The closing member 230 may be provided to be inserted into the exposing hole 240 so as not to protrude from the outer surface of the cover 90. The diameter of the closing member 230 may be formed to correspond to the diameter of the exposing hole 240.

The exposing hole 240 may be formed by a side wall 250 extending from the inner side of the cover 90 to the second chassis 84 and extending around the exposing hole 240. The exposing hole 240 has a diameter greater than the diameter of the mounting hole 112 so that the mounting hole 112 of the mounting unit 200 may be exposed when the closing member 230 is removed from the cover 90. In addition, the side wall 250 may be provided with a protruding portion 252 that restricts the entry of the closing member 230 so that the closing member 230 is not inserted too deeply.

The closing member 230 may include a supporting portion 233 supported by the protruding portion 252 provided on the sidewall 250 of the exposing hole 240. In addition the closing member 230 may include a handle portion 234 configured to allow a user to catch the closing member 230 when the closing member 230 is removed from the exposing hole 240.

Referring to FIGS. 16 and 17, the diameter of the supporting portion 233 of the closing member 230 may be set to correspond to the diameter of the fore-end of the exposing hole 240, and the diameter of the handle portion 234 may be smaller than the diameter of the supporting portion 233.

The mounting unit 200 provided in the second chassis 84 may include a mounting hole 112. The mounting hole 112 may include a thread 114 formed on the inner wall of the mounting hole 112 so as to engage with a fastening member such as a screw. The mounting hole 112 may be formed integrally with the second chassis 84. Alternatively, the mounting hole 112 may be formed in a separate rigid member 110 and then the rigid member 110 is coupled to the second chassis 84.

A side wall 250 of the exposing hole 240 may extend a distance between the second chassis 84 and the cover 90 when the cover 90 is coupled to the second chassis 84 or a distance between the fore-end of the exposing hole 240 and the mounting hole 112 so that a foreign substance such as dust entering through the exposing hole 240 does not enter the inside of the cover.

The closing member 230 shown in FIGS. 16 and 17 may include an elastic material such as rubber. The diameter of the supporting portion 233 of the closing member 230 is formed to correspond to the diameter of the fore-end of the exposing hole 240. The closing member 230 have a cavity formed inside the supporting portion 233 so that the insertion portion may be easily inserted into the exposing hole 240 by elastic deformation and the closing member 230 may not be freely removed from the exposing hole 240 due to the restoring force.

In the above-described embodiments, the concealing portion 210 and the closing member 230, which are configured to conceal the mounting hole 112, may be collectively referred to as a concealing member that may be removed in the process of mounting the display apparatus 1 on the installation surface, that is, on the wall surface.

As shown in FIGS. 12 to 17, when the concealing member is formed as the closing member 230, the closing member 230 is removed when the display apparatus 1 is mounted on the installation surface, that is, the wall surface, and when the display apparatus 1 is detached from the installation surface, the closing member 230 may be coupled to the exposing hole 240 to be used for concealing the mounting hole 112.

The wall mounting unit 200 and the concealing unit 100 of the display apparatus 1 described above may be applied to all products that may be mounted on a wall other than the display apparatus.

While the present disclosure has been particularly described with reference to exemplary embodiments, it should be understood by those of skilled in the art that various changes in form and details may be made without departing from the spirit and scope of the present disclosure.

The invention claimed is:

1. A display apparatus comprising:
a chassis disposed at a rear side of a display panel to support the display panel;
a cover coupled to a rear side of the chassis to cover the chassis;
a plurality of mounting holes provided on the chassis; and
a plurality of concealing units provided on the cover,
wherein the plurality of concealing units are configured to cover the plurality of mounting holes and are removable from the cover to expose the plurality of mounting holes,
wherein each of the plurality of concealing units comprises:
a concealing portion formed integrally with the cover to conceal respective ones of the plurality of mounting holes; and
a removing guide portion provided to facilitate removal of the concealing portion, and
wherein the removing guide portion comprises at least two slits formed as a cut out along a circumference of the concealing portion, and at least one guide groove formed as a notch on an inner surface of the cover along the circumference of the concealing portion where the at least two slits are not formed.

2. The display apparatus of claim 1, wherein each of the plurality of concealing units comprise:
an exposing hole formed in the cover; and
a closing member closing the exposing hole.

3. The display apparatus of claim 2,
wherein the closing member includes a surface having adhesiveness.

4. The display apparatus of claim 3, wherein the closing member comprises:
a supporting portion supported by the protruding portion; and
a handle portion configured to facilitate disengaging the closing member.

5. The display apparatus of claim 2, wherein the closing member comprises:
an insertion portion insertable into the exposing hole; and
a head portion to be supported by the cover.

6. The display apparatus of claim 5,
wherein the insertion portion comprises an escape-resistant structure configured to facilitate entry only in an insertion direction.

7. The display apparatus of claim 2,
wherein the concealing unit comprises a side wall extending from the circumference of the exposing hole of the cover in a direction toward the chassis, and
wherein the side wall is provided with a protruding portion to restrict entry of the closing member.

8. The display apparatus of claim 1, wherein the mounting unit comprises:
a blocking wall provided around each of the mounting holes to prevent the removed concealing unit or foreign substance from entering the inside of the cover.

9. The display apparatus of claim 1,
wherein the concealing portion is configured to be removable by inserting a separate member into the at least one slit.

10. The display apparatus of claim 1,
wherein the removing guide portion comprises at least two slits, and
wherein the concealing portion is configured to be removable by rotating the concealing portion.

11. The display apparatus of claim 1,
wherein the guide groove is furrowed along the circumference of the concealing portion to be thinner than the thickness of the cover.

12. The display apparatus of claim 1,
wherein the concealing portion is configured to be removable by being pressed.

* * * * *